United States Patent [19]

Sahasrabudhe

[11] 4,225,813
[45] Sep. 30, 1980

[54] TRANSIT VEHICLE DYNAMIC BRAKE CONTROL APPARATUS

[75] Inventor: Arun P. Sahasrabudhe, West Mifflin, Pa.

[73] Assignee: Westinghouse Electric Corp., Pittsburgh, Pa.

[21] Appl. No.: 964,313

[22] Filed: Nov. 28, 1978

[51] Int. Cl.² .......................... H02P 3/16; H02P 3/26
[52] U.S. Cl. ..................................... 318/371; 318/758
[58] Field of Search ............... 318/371, 372, 381, 270, 318/614, 87, 366, 274, 269, 273, 758, 759, 757; 188/159, 160

[56] References Cited

U.S. PATENT DOCUMENTS

| 2,933,667 | 4/1960 | Purifoy | 318/60 |
|---|---|---|---|
| 3,277,355 | 10/1966 | Troutman et al. | 318/369 |
| 3,488,570 | 1/1970 | Vint, Jr. et al. | 318/371 |
| 3,543,113 | 11/1970 | Miller | 318/142 |
| 3,569,811 | 3/1971 | Miller et al. | 318/381 |
| 3,593,089 | 7/1971 | Appelo | 318/370 |
| 3,657,625 | 4/1972 | Miller et al. | 318/370 |
| 3,665,272 | 5/1972 | Spiess et al. | 318/758 |
| 3,899,725 | 8/1975 | Plunkett | 318/758 |

FOREIGN PATENT DOCUMENTS

| 996238 | 8/1976 | Canada | 318/371 |
|---|---|---|---|
| 1438812 | 2/1969 | Fed. Rep. of Germany | 318/371 |

OTHER PUBLICATIONS

"Propulsion Control for Passenger Trains Provides High Speed Service", *Westinghouse Eng.* 9–70, pp. 143–149.

"Passenger Transfer System Will Take the Long Walk Out of Air Travel", *Westinghouse Eng.*, 1–69, pp. 9–15.

*Primary Examiner*—David Smith, Jr.
*Attorney, Agent, or Firm*—R. G. Brodahl

[57] ABSTRACT

The present invention relates to an improved dynamic brake effort control apparatus for use with loads such as a transit vehicle, and which provides a better control of and blending of dynamic brake effort and friction brake effort in relation to the vehicle speed for the improved braking control of the transit vehicle.

12 Claims, 9 Drawing Figures

TRANSIT VEHICLE DYNAMIC BRAKE CONTROL APPARATUS

BACKGROUND OF THE INVENTION

For the purpose of braking rapid transit vehicles three types of braking efforts are generally utilized. The first is mechanical friction braking effort, the second is dynamic braking effort, and the third is emergency spring braking effort. The first two of these are used to control the vehicle speed during normal running of the vehicle and the third is used for emergency stops. Dynamic braking effort depends upon the kinetic energy stored in the vehicle, and employs the propulsion motors to generate electrical energy that is dissipated in provided resistors as a function of the current that flows in the resistors. At higher vehicle speeds, since the back EMF of the motors is high, more effective dynamic braking can be provided than at lower speeds. Therefore, when dynamic braking is to be provided, it is usually desirable first to apply more of the dynamic braking at higher speed and as the vehicle slows down then to apply more of the friction braking.

In the prior art practice of applying dynamic braking one problem was to control the dynamic braking effort as desired since an accurate feedback determination of the actual dynamic braking effort was not readily obtainable. In addition, it was desired to provide blending between the mechanical friction braking and the dynamic braking, such that as the dynamic braking effort decreased as a function of the lower vehicle speeds the mechanical friction braking effort built up as necessary to provide the desired total braking effort for the vehicle. As the dynamic brakes fade out, the friction brakes should come in such that the total braking effort is controlled as desired by the operator or the automatic train operation control apparatus. The friction brakes can have a significant time delay as compared to the dynamic brakes, so it is difficult to provide smooth blending such that the vehicle passengers would not sense a variation in the vehicle movement caused by this blending effort.

It is known in the prior art to provide a dynamic brake effort determination apparatus which responds to vehicle speed and motor armature current for providing some indication of the actual dynamic brake effort. Such apparatus has been provided in relation to transit vehicles as described in a published article entitled "Passenger Transfer System Will Take The Long Walk Out Of Air Travel" which appeared in the *Westinghouse Engineer* for January 1969 at pages 9 through 15.

A general discussion of the control of the power or braking operation of a transit vehicle in response to a train line P signal and a power or brake selection mode signal, as well as the blending of the mechanical and dynamic braking efforts, is provided in an article entitled "Propulsion Control For Passenger Trains Provides High Speed Service" that was published in the September 1970 *Westinghouse Engineer* at pages 143 to 149.

SUMMARY OF THE INVENTION

The present invention relates to an improved dynamic brake effort control apparatus for operation with a transit vehicle, wherein an improved control of the provided dynamic brake effort is achieved and a predetermined desired blending of the friction brake effort with the dynamic brake effort is provided for particularly the lower speeds of the vehicle.

DESCRIPTION OF THE PREFERRED EMBODIMENT

Figure 1:
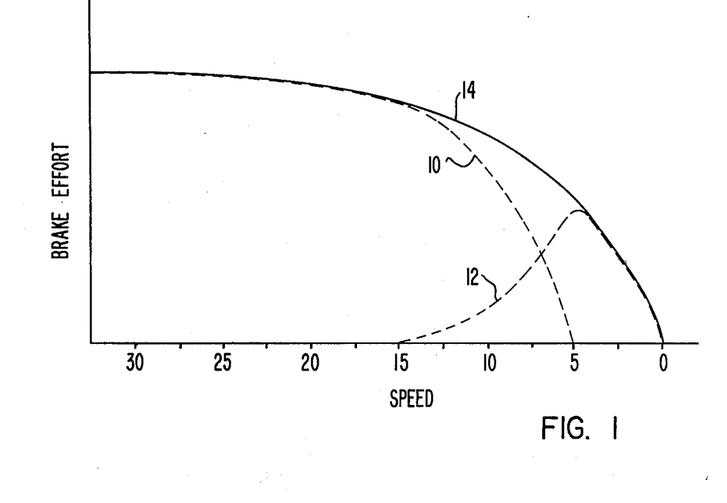
FIG. 1 graphically illustrates the desired blending of dynamic brake effort and friction brake effort for a transit vehicle to provide a desired total brake effort as a function of the decrease in speed of the vehicle.

In FIG. 1 there is illustrated the desired blending of the dynamic braking effort as shown by curve 10 and the mechanical brake effort as shown by curve 12 to provide a total brake effort 14 for a transit vehicle. In general dynamic brake effort 10 is desired as long as the actual vehicle speed is greater than about one-half the maximum vehicle speed. If the maximum speed is 30 MPH, such as for the illustration shown in FIG. 1, then full dynamic braking is desired to reduce the vehicle from 30 to about 15 MPH, and below 15 MPH the dynamic brake effort 10 is reduced or tapered down. At 15 MPH and above, the dynamic brake control loop is very responsive to and will follow the desired total brake effort control signal without significant delay, while below 15 MPH such delays might be present to result in a loss of control of the dynamic brake effort and for this reason the dynamic brake effort is reduced or tapered down below about 15 MPH.

Figure 2:
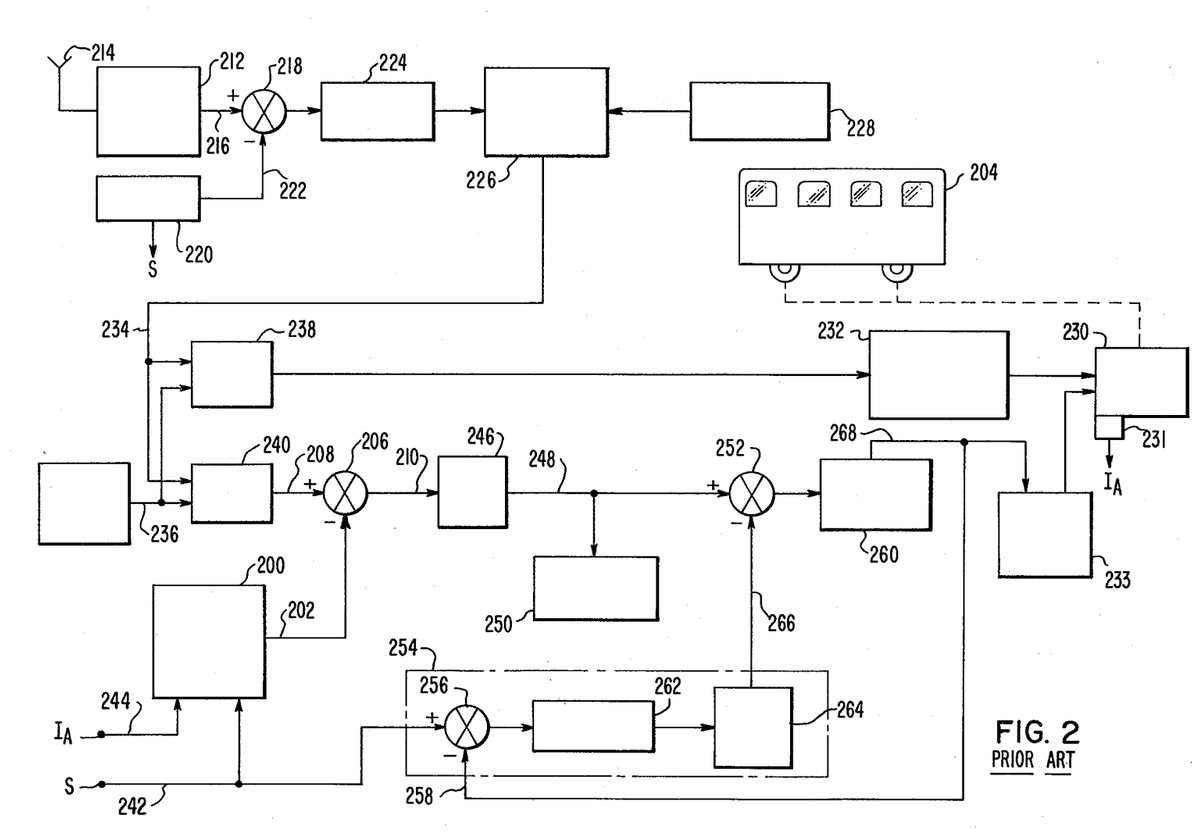
FIG. 2 diagrammatically shows a known prior art dynamic brake effort determination and control apparatus.

In FIG. 2 there is shown the dynamic brake effort determination and control apparatus that has been previously referenced in the January 1969 published article and was used to control the dynamic braking effort of propulsion motors. The dynamic brake effort determination apparatus 200 is providing an output signal 202 attempting to follow the actual dynamic brake effort provided for the vehicle 204 which carries the control apparatus shown in FIG. 2. The output signal 202 is applied to one input of comparator 206 in conjunction with the desired total brake effort signal 208 for providing a brake effort error signal 210.

The vehicle 204 carries a command receiver and decoder 212 operating with a speed command receiving antenna 214 to receive the wayside provided speed command signal and decodes it to provide a desired speed signal on input 216 of comparator 218. A tachometer 220 is coupled with the vehicle wheels and provides an actual speed signal to input 222 of the comparator 218. A speed error signal is provided to the speed controller 224, which then provides the well-known P signal to the vehicle load weight interpreter 226. The load weight sensor 228 operates with the vehicle support apparatus to sense the weight of the vehicle and includes variable resistance that varies with the load and provides a signal to the interpreter 226 to change the P signal up or down to permit developing a total tractive effort control signal that is a function of the passenger load on the vehicle and the desired level of acceleration or deceleration. Thus, the tractive effort control P signal is modified by the vehicle load weight interpreter 226 for controlling the armature current of the propulsion motors in the motor circuits 230 in the power mode, or for controlling the field current of the motors in the brake mode. The motor circuits 230 are understood to include a motor armature current sensing device 231 and suitable dynamic braking resistors and associated apparatus as well known to persons skilled in this art. The vehicle propulsion motor control apparatus 232 responds to the total tractive effort request signal on the conductor 234 in the power mode. The brake motor control apparatus 233 responds to the total tractive effort request signal on the conductor 234 in the brake mode. A mode selection signal 236 is applied selectively to one of gates 238 to apply the tractive effort request signal for the power mode operation to the vehicle propulsion motor control apparatus 232 for supplying armature current to the motors in motor circuits 230 or is applied after logical inversion to gate 240 to apply the tractive effort request signal for the brake mode operation to the comparator 206 for establishing the brake effort error signal 210.

The tachometer 220 supplies the vehicle actual speed signal to an input 242 and a motor armature current signal is supplied to input 244 of the dynamic brake effort determination apparatus 200, which provides an estimated dynamic braking effort signal 202 to comparator 206. The brake effort error signal 210 is amplified by a gain circuit to develop a brake control signal 248 which controls the operation of the mechanical brake control 250 and the mechanical brakes of the vehicle 204. The same brake control signal 248 is applied to an input of comparator 252.

A taper control apparatus 254 receives the vehicle speed signal at one input of comparator 256, with the other input receiving a motor field current control signal 258 from the output of a proportional plus integral controller 260. The difference output of the comparator 256 goes through an integrator 262 and a gain circuit 264 for providing a dynamic brake reduction signal 266 to the second input of the comparator 252. The brake control signal 248 is reduced through operation of the comparator 252 and the taper control signal 266 and goes to the PI controller 260 for providing a motor field current control signal 268 which controls the firing angle of the thyristors in the brake motor control apparatus 233 to control the dynamic brake effort of the vehicle motors. The respective circuits 246 and 264 have predetermined gain characteristics in accordance with the known mechanical brake system and dynamic brake systems of the particular vehicle 204.

Figure 3:
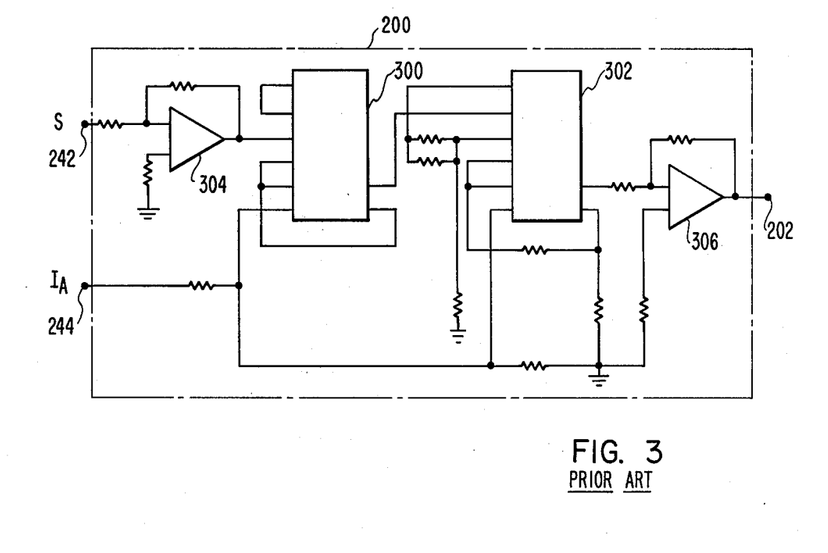
FIG. 3 schematically shows the dynamic brake effort determination apparatus of FIG. 2.

In FIG. 3 there is shown the dynamic brake effort determination apparatus 200 of FIG. 2 that has been previously used to control the dynamic braking effort of propulsion motors. The determined dynamic braking effort output signal 202 is attempting to follow the actual dynamic brake effort provided for the vehicle. The apparatus 200 utilizes two multifunction modules 300 and 302 and two operational amplifiers 304 and 306 for this purpose. The multifunction modules 300 and 302 can comprise apparatus presently sold in the open market by Analog Devices and designated as module 433J.

Figure 4:
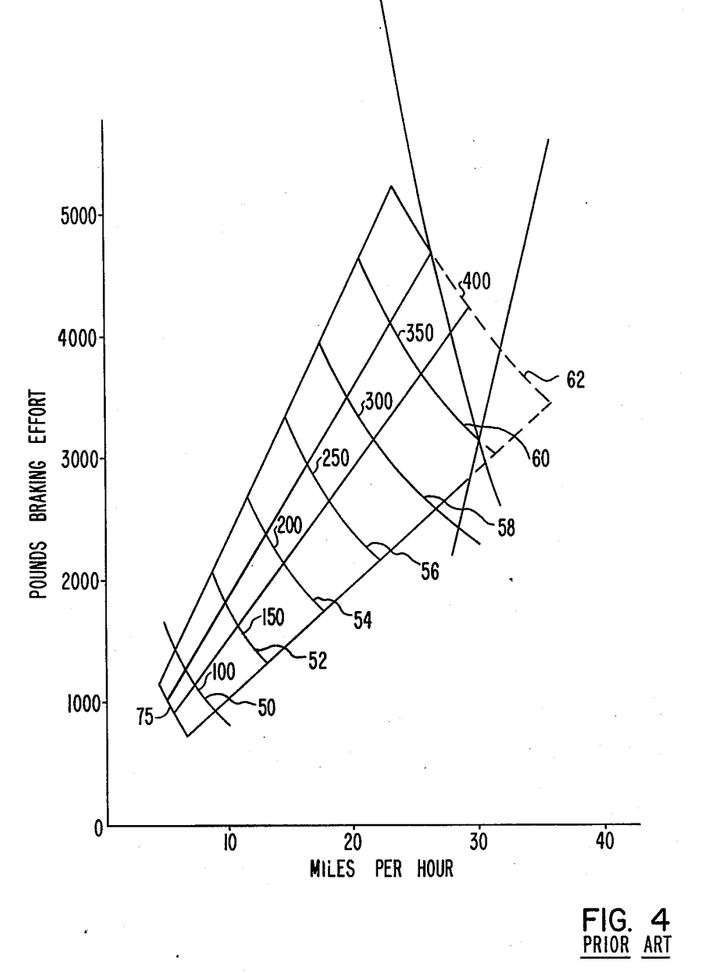
FIG. 4 graphically shows the well-known relationship for a given motor type of the dynamic braking effort as a function of vehicle speed, armature current and field current.

In FIG. 4 there is shown a set of curves to illustrate the brake effort, vehicle speed, armature current and field current characteristics of a transit vehicle propulsion motor when operating to dynamically brake a vehicle. These curves are a function of the motor type, such as a well-known type 1460 ST motor, the value of the dynamic brake resistance and the gear ratio. From these curves a relationship can be established to relate vehicle speed and brake effort for a known armature current condition of operation.

Figure 5:
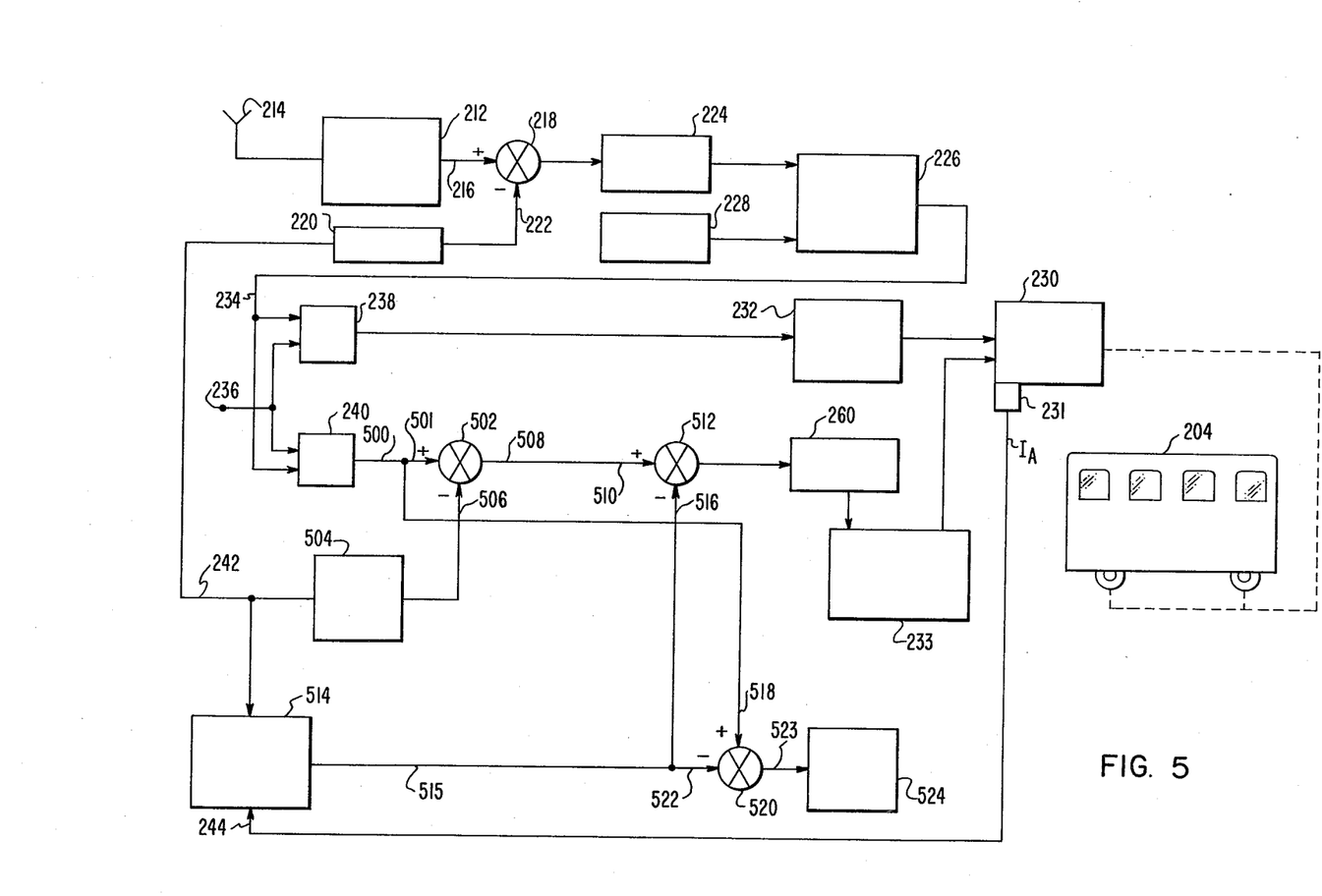
FIG. 5 diagrammatically shows the dynamic brake effort determination and control apparatus of the present invention.

In FIG. 5 there is shown the dynamic brake effort determination and control apparatus of the present invention. Similar to the showing of FIG. 2, the vehicle speed command receiver and decoder 212 operating with a speed command receiving antenna 214 receives the wayside provided speed command signal and decodes it to provide a desired speed signal on input 216 of comparator 218. A tachometer 220 is coupled with the vehicle wheels and provides an actual speed signal to input 222 of the comparator 218. A speed error signal is provided to the speed controller 224, which then provides the well known P signal to the vehicle load weight interpreter 226. The load weight sensor 228 operates with the vehicle support apparatus to sense the weight of the vehicle and includes variable resistance that varies with the load and provides a signal to the interpreter 226 to change the P signal up or down to permit developing a total tractive effort control signal that is a function of the passenger load on the vehicle and the desired level of acceleration or deceleration. Thus the tractive effort control P signal is modified by the vehicle load weight interpreter 226 for controlling the armature current of the propulsion motors in the motor circuits 230 in the power mode, or for controlling the field current of the motors in the brake mode. The vehicle propulsion motor control apparatus 232 responds to the total tractive effort request signal on the conductor 234 for this purpose in the power mode. The brake motor control apparatus 233 responds to the total tractive effort request signal on the conductor 234 for this purpose in the brake mode. A mode selection signal 236 is applied selectively to gate 238 to apply the tractive effort request signal for the power operation to the vehicle propulsion motor control apparatus 232 for supplying armature current to the motors in motor circuits 230 and is applied after logical inversion to gate 240 to apply the tractive effort request signal for brake operation to the brake motor control apparatus 233 to control the dynamic brake effort of the motor circuits 230.

In the brake mode of operation the AND gate 240 passes the tractive effort request signal 500 from conductor 234 to one input 501 of the comparator 502.

In FIG. 5, in accordance with the present invention, a taper control apparatus 504 provides a predetermined dynamic brake effort reduction signal 506 to the input of the comparator 502 for a purpose to be subsequently explained. The output signal 508 from the comparator 502 is the dynamic brake request signal, and it is applied to input 510 of a comparator 512. The dynamic brake effort determination apparatus 514 operates in relation to the curves shown in FIG. 4 and provides a determined dynamic brake effort signal 515 to the input 516 of the comparator 512, which provides to the PI controller 260 a field current controlling signal for determining the dynamic brake effort of the motor circuits 230 through the brake motor control apparatus 233.

The total tractive effort brake request signal 500 is applied to input 518 of comparator 520. The determined dynamic brake effort signal 515 is applied to a second input 522 of the comparator 520. The resulting difference signal 523 from the comparator 520 is applied to the mechanical brake control 524 for establishing the mechanical friction brake effort for the vehicle 204.

Figure 6:
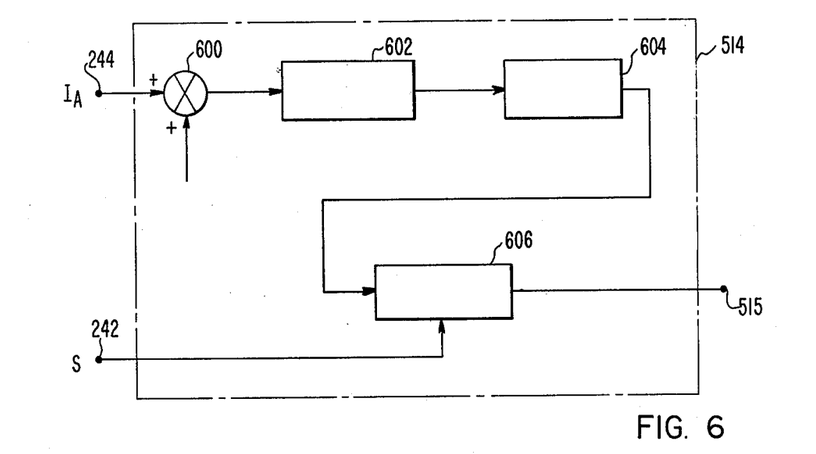
FIG. 6 functionally shows the dynamic brake effort determination apparatus of FIG. 5.

In FIG. 6 there is functionally shown the dynamic brake effort determination apparatus 514 of FIG. 5. The motor armature current signal 244 is applied to comparator 600 for providing a predetermined offset which is added to the motor armature current to correct for non-linearity in the lower speed and in the lower armature current region of the dynamic brake effort curves shown in FIG. 4, the offset operates to correct the resulting determined dynamic brake effort signal that is output by the dynamic brake effort determination apparatus 514. The output of comparator 600 is applied to gain block 602 for multiplication by a gain K1, which gain is related to the particular system scaling, such as motor current scaling and selected gear ratios, of the input signal. The output of gain block 602 is a product K which represents a base number and has a linear relationship with the motor armature current signal 244. A squarer 604 is provided to square the product K, and a divider 606 is provided to divide $K^2$ by the vehicle speed signal 242. The output of divider 606 is the determined dynamic brake effort signal 515 shown in FIG. 5.

Figure 7:
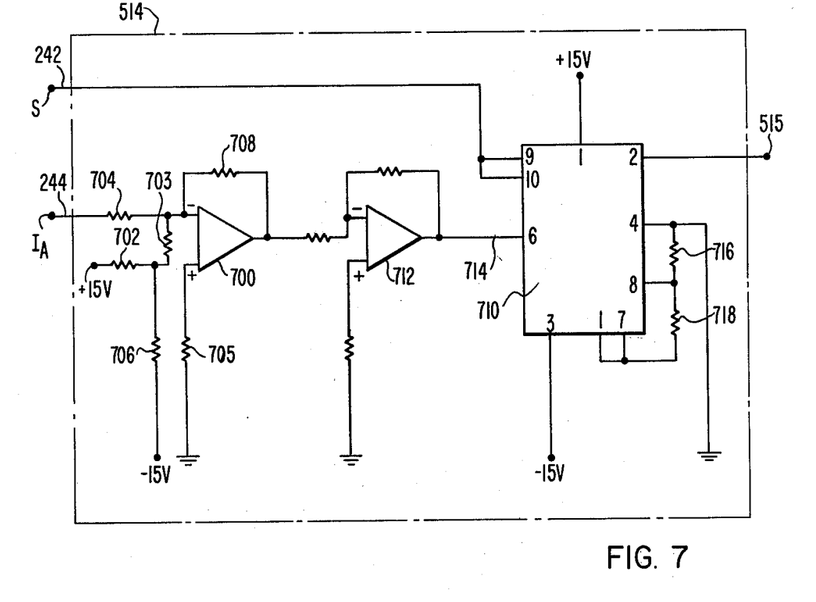
FIG. 7 schematically shows the dynamic brake effort determination apparatus of FIG 5.

In FIG. 7 there is schematically shown the dynamic brake effort determination apparatus 514 of FIG. 5 and in accordance with the present invention to provide an output signal 515 in accordance with the actual dynamic brake effort operation of the moving transit vehicle 204 and in relation with the curves of FIG. 4. It should be noticed in relation to FIG. 4 that each of the armature current curves 50, 52, 54, 56, 58, 60, and 62 is of the form of a rectangular hyperbola that can generally be represented by a constant squared, and that these armature current curves are placed equidistances apart to indicate a linear relationship between the armature current and this constant which represents a given curve. A base number can thus be established for each curve and once the base number is established for a given armature current curve, and knowing the vehicle velocity the dynamic brake effort can then be determined. In FIG. 7 the operational amplifier 700 responds to the sensed motor armature current 244 to establish the base number in accordance with a first relationship $$\text{Base number} = (I_A/K_1)(8.55) + 1.2 \tag{1}$$

using a scaling for an illustrative transit system of +10 volts DC equals 30 miles per hour speed, +10 volts DC equals 4,000 pounds of dynamic braking effort, and +13 volts equals 300 amps armature current. For these scaling relationships K1 equals 2.17 volts. The factor 1.2 is implemented by the resistors 702, 703, and 706 as a ratio of resistor 708. The input resistor 704 and feedback resistor 708 give the factor $1/K_1$ (8.55)=K3. The resistor 708 has a value of K3 divided by 7.317 because of the operation of pin 6 of module 710 to raise the input to a power of 2 in order to achieve correct scaling for miles per hour and braking effort in pounds. This scaling of resistor 708 is necessary to avoid saturation of the operational amplifier 700 to keep it in the linear mode and also to avoid saturation of the module 710. The operational amplifier 712 is a unity gain inverter, because the module 710 requires positive inputs and the output of operational amplifier 700 is negative so the amplifier 712 provides an inversion and the module 710 receives a positive input 714. A second relationship $$K^2 = K2 \text{ (Base number)}^2 \tag{2}$$

is implemented where K2 equals 0.02075 volts$^2$ and a linear relationship has been established between the armature current and K. A third relationship $$\text{Braking effort} = (K^2/\text{speed}) \tag{3}$$

establishes the braking effort since the curve shown in FIG. 4 relates velocity times the braking effort equal to this variable $K^2$, so this relationship is solved for the braking effort.

The module 710 also receives a vehicle speed signal 242. The module 710 is programmed by the resistors 716 and 718, and since 716 equals 718, this gives a programmable exponent M for module 710 equal to 2 and provides a squaring of the ratio of voltages V6 to V9 at inputs 6 and 9 respectively. Therefore in effect K is squared and divided by speed to solve the above third relationship for the dynamic braking effort. With the scaling of K1 equal to 2.17 volts, and K2 equal to 0.02075 volts$^2$, the above equations become $$\text{Base number} = I_A \frac{8.55}{2.17} + 1.2 \tag{4}$$

$$= K3 \, I_A + 1.2 \tag{5}$$

$$K^2 = 0.02075 \text{ (Base number)}^2 \tag{6}$$

$$\text{Braking Effort} = \frac{K^2}{\text{speed}} \tag{7}$$

The resistors 702, 706, and 703 shown in FIG. 7 and the ratio of 708 to equivalent resistance of 702, 706 and 703 provide the offset term in equation 4, which is 1.2 volts. The ratio of 708 and resistance of 704 provides the term K3×$I_A$. The resistor 708 is scaled by a factor 7.317 which serves two purposes; it prevents saturation of the operational amplifier 700 at maximum level of $I_A$ and it provides the correct set of numbers so that when the base number is squared by the module 710 the output has the multiplier K2. The module 710 has a transfer function which is programmed by resistors 716 and 718. In this case since the base number needs to be squared, 716 and 718 are equal to give the programmable exponent M for module 710 a value of 2. The speed signal is fed into pins 9 and 10 such that the square of the base number gets divided by the speed. The output 515 is the determined actual dynamic braking effort.

Figure 8:
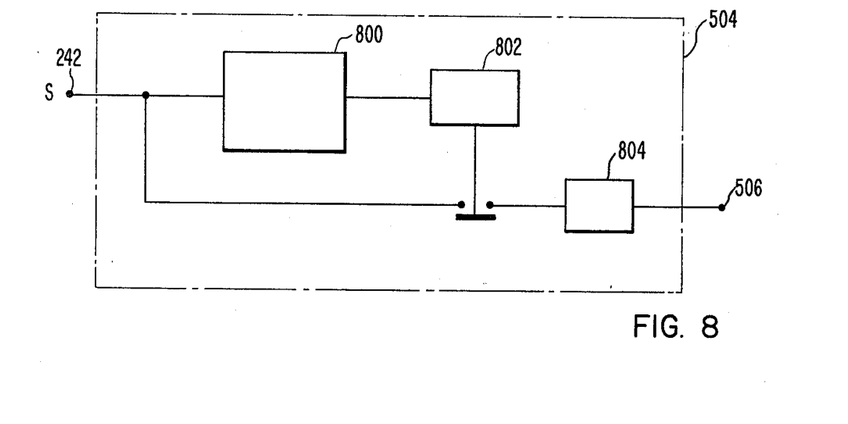
FIG. 8 diagrammatically shows the taper control apparatus of FIG. 5.

In FIG. 8 there is diagrammatically shown the taper control apparatus 504 of FIG. 5. A bistable Schmitt trigger circuit 800 responds to the vehicle speed signal 242 such that the relay 802 is not energized until the vehicle velocity falls to a selected value, such as 15 MPH. When the velocity reduces during braking to 15 MPH, then the relay 802 is energized and the vehicle speed signal 242 is applied to the gain circuit 804. It is desired that the output 506 be continuously variable after the 15 MPH threshold is reached, and this begins the desired taper reduction of the dynamic brake request signal through the comparator 502. The gain characteristic of the gain circuit 804 was chosen to be two for a particular application of the present apparatus, and this can be adjusted depending upon the desired taper in a given system or modification reduction in the dynamic brake request and the known brake characteristics of the particular vehicle motor being controlled.

Figure 9:
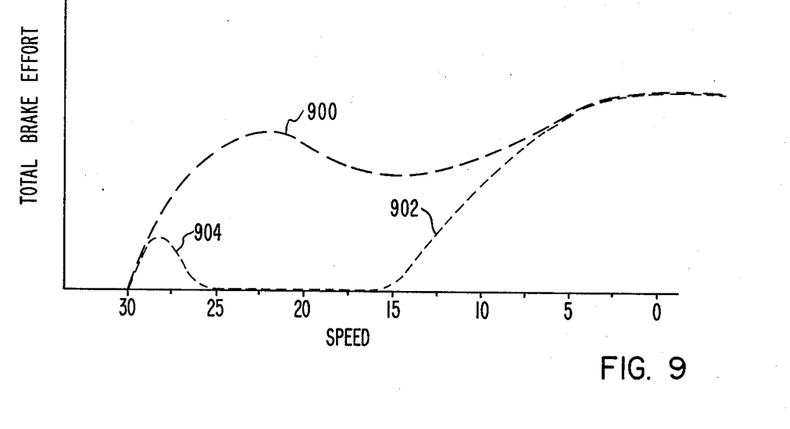
FIG. 9 graphically illustrates the operation of the dynamic brake effort determination and control apparatus of the present invention.

In FIG. 9 there is illustrated the operation of the dynamic brake effort determination and control apparatus of the present invention. The prior art apparatus as shown in FIG. 2 applies the mechanical brakes in accordance with the curve 900, since the same brake control signal 248 is applied to the mechanical brake control 250 and to the comparator 252 and PI controller 260 for establishing the dynamic brake effort, such that the mechanical brake operation will start immediately upon the brake mode of operation for the vehicle. The control apparatus of the present invention as shown in FIG. 5, will apply the mechanical brakes as shown by curve 902 of FIG. 9 and curve 12 of FIG. 1, since the dynamic brake request 508 shown in FIG. 5 is independent of the brake difference or error signal 523 applied to the mechanical brake control 524. In addition, the dynamic brake request 508 complements the mechanical brake request 523 in that when the actual dynamic brake effort is high, the output 515 of the dynamic brake effort determination apparatus 514 will be high and the resulting output 523 of comparator 520 will be low to yield the desired total brake effort 500.

With the control apparatus of FIG. 2, when the actual dynamic brake effort is high, the output of comparator 206 will be low and this operates to reduce both the mechanical brake operation and the dynamic brake operation.

In FIG. 9 there is shown a curve 904 which shows a possible initial mechanical brake operation when the vehicle brake mode is initiated depending upon the delay response time of the dynamic brake operation, but the dynamic brake would be the primary effort until the taper reduction begins at about 15 MPH as shown by curve 902 in FIG. 9.

The brake control apparatus 233 shown in FIG. 5 responds to the dynamic brake effort error PI controller 260 and puts out a voltage to control the firing angle of thyristor devices which control the field current in the field winding of each motor in the motor circuits 230. This field winding current in turn controls the amount of armature current that will flow through the dynamic braking resistors and thereby controls the vehicle dynamic braking effort. As the vehicle speed decreases it is desired to force the brake request signal on conductor 508 to decrease, such as shown by curve 10 in FIG. 1. For example, it might be desired that the braking effort be comprised of predominantly a dynamic brake effort to be applied until the vehicle speed is less than one-half the maximum vehicle speed. And if the maximum vehicle speed is in the order of 30 MPH, then below 15 MPH the dynamic brake request signal on conductor 508 is forcibly reduced or tapered down to zero at a vehicle speed where the dynamic brake effort has substantially lost effective control of the vehicle braking and where the mechanical friction brake effort has had an opportunity to assume the total desired braking effort. For vehicle speeds above 15 MPH, the dynamic brake control loop responds fast and will follow the brake request signal without appreciable delay. At lower vehicle speeds the response is slower and loss of control can result, so the dynamic brake request signal 508 is tapered down to zero in this manner as controlled by vehicle speed. The desired blending of the dynamic brake and mechanical brake efforts occurs around and below 15 MPH. The friction brake operation includes delays like those encountered in an open loop control system. Any delay in vehicle speed reduction that results from lack of response by the mechanical brakes will cause the taper control apparatus 504 to change less and this continues the dynamic brake effort, since the reduction taper provided by the taper control apparatus 504 is a function of vehicle speed, such that the dynamic brake effort will continue to brake the vehicle as desired until the mechanical friction brakes take over the desired braking effort.

What is claimed is:

1. In brake control apparatus for a vehicle having a motor and mechanical friction brakes, said apparatus being responsive to a total tractive effort signal, a vehicle speed signal and a motor armature current signal, the combination of means establishing a determined dynamic brake effort signal in response to the vehicle speed signal and the motor armature current signal, means establishing a brake effort reduction signal in response to the vehicle speed signal, means operative with said motor and establishing a dynamic brake effort control signal in accordance with the difference between said total tractive effort signal and said brake effort reduction signal for controlling the dynamic brake effort of the vehicle, and means operative with said mechanical friction brakes and establishing a mechanical brake effort control signal in accordance with the difference between said total tractive effort signal and said determined dynamic brake effort signal for controlling the mechanical friction brakes.

2. The brake control apparatus of claim 1, with the dynamic brake effort control signal establishing means being responsive to said determined dynamic brake effort signal.

3. The brake control apparatus of claim 1, with said mechanical brake effort control signal establishing means including signal comparison apparatus responsive to each of the total tractive effort signal and the determined dynamic brake effort signal.

4. The brake control apparatus of claim 1, with said brake effort reduction signal establishing means being responsive to the vehicle speed signal for establishing the brake effort reduction signal when the vehicle speed is below a predetermined value for reducing the dynamic brake effort control signal for vehicle speeds below that predetermined value.

5. The brake control apparatus of claim 1, with the dynamic brake effort control signal establishing means providing the predominant brake effort for the vehicle above a predetermined vehicle speed, and with the mechanical brake effort control signal establishing means providing the predominant brake effort for the vehicle below that predetermined vehicle speed.

6. In brake control apparatus for a vehicle having a motor and mechanical friction brakes, said apparatus being responsive to a total tractive effort signal, a vehicle speed signal and a motor armature current signal, the combination of first means responsive to the vehicle speed signal and the motor armature current signal for providing a determined dynamic brake effort signal, second means responsive to the vehicle speed signal for providing a brake effort modification signal, third means responsive to the total tractive effort signal and the determined dynamic brake effort signal for controlling one of the dynamic brake effort of the motor and the mechanical friction brakes, and fourth means responsive to the total tractive effort signal and the brake effort modification signal for controlling the other of the dynamic brake effort of said motor and the mechanical friction brakes.

7. The brake control apparatus of claim 6, with said third means being responsive to the determined dynamic brake effort signal for controlling said other of the dynamic brake effort of the motor and the mechanical friction brakes of the vehicle.

8. The brake control apparatus of claim 6, with the brake effort modification signal being operative above a predetermined vehicle speed to cause the dynamic brake effort of said motor to provide the predominant brake effort of said vehicle.

9. The brake control apparatus of claim 6, with the brake effort modification signal above a predetermined vehicle speed having a substantially zero value.

10. The brake control apparatus of claim 7, with the brake effort modification signal above a predetermined vehicle speed causing the dynamic brake effort of the motor to be the predominant brake effort of the vehicle and below that predetermined vehicle speed causing the mechanical friction brake effort to be the predominant brake effort of the vehicle.

11. In brake control apparatus for a transit vehicle having a motor with a dynamic brake circuit, said apparatus being responsive to a tractive effort signal, the vehicle speed and the motor current, the combination of means responsive to the motor current for providing a first signal having each of a predetermined offset and a desired linear relationship with the motor current, means responsive to said first signal and the vehicle speed for providing a second signal in accordance with each of a predetermined exponential of the first signal and an inversely proportional relationship to the vehicle speed, and means operative with the motor for establishing a dynamic brake effort control signal in accordance with the difference between the tractive effort signal and the second signal for controlling the dynamic brake effort of the vehicle.

12. The brake control apparatus of claim 11, including means responsive to the vehicle speed for providing a brake effort modification signal, with said dynamic brake effort control signal establishing means being responsive to the brake effort modification signal for providing a desired modification of the dynamic brake effort control signal below a predetermined value of the vehicle speed.

* * * * *